(12) United States Patent
Giselmo et al.

(10) Patent No.: US 7,574,862 B2
(45) Date of Patent: Aug. 18, 2009

(54) TURBO CHARGER UNIT COMPRISING DOUBLE ENTRY TURBINE

(75) Inventors: Kent Giselmo, Vellin (SE); Per Andersson, Malmö (SE); Magnus Ising, Lund (SE)

(73) Assignee: Volvo Lastvagnar AB, Göteborg (SE)

( * ) Notice: Subject to any disclaimer, the term of this patent is extended or adjusted under 35 U.S.C. 154(b) by 319 days.

(21) Appl. No.: 11/573,998

(22) PCT Filed: Sep. 22, 2004

(86) PCT No.: PCT/SE2004/001365

§ 371 (c)(1),
(2), (4) Date: Feb. 20, 2007

(87) PCT Pub. No.: WO2006/038836

PCT Pub. Date: Apr. 13, 2006

(65) Prior Publication Data

US 2009/0019849 A1     Jan. 22, 2009

(51) Int. Cl.
  F02B 33/44    (2006.01)
  F02D 23/00    (2006.01)
  F02B 33/00    (2006.01)
  F01D 1/02     (2006.01)
  F01D 9/00     (2006.01)
  F01D 9/04     (2006.01)

(52) U.S. Cl. ............ 60/612; 60/602; 123/562; 415/205; 415/206

(58) Field of Classification Search ........... 60/602, 60/612; 123/562; 415/204–205
See application file for complete search history.

(56) References Cited

U.S. PATENT DOCUMENTS

| | | | | |
|---|---|---|---|---|
| 41,567 A | * | 2/1864 | Brooks | 415/205 |
| 2,646,210 A | * | 7/1953 | Kohlmann et al. | 417/407 |
| 3,137,477 A | * | 6/1964 | Kofink | 415/205 |
| 3,173,241 A | * | 3/1965 | Birmann | 60/602 |
| 3,313,518 A | * | 4/1967 | Nancarrow | 415/205 |
| 3,383,092 A | * | 5/1968 | Cazier | 415/205 |
| 3,423,926 A | * | 1/1969 | Holzhausen et al. | 60/602 |
| 3,664,761 A | * | 5/1972 | Zastrow | 415/205 |
| 3,844,676 A | * | 10/1974 | Betteridge | 60/602 |

(Continued)

FOREIGN PATENT DOCUMENTS

CN           1892046 A   *   1/2007

(Continued)

*Primary Examiner*—Thai Ba Trieu
(74) *Attorney, Agent, or Firm*—WRB - IP LLP

(57) ABSTRACT

A turbocharger unit for a multicylinder internal combustion engine has at least two exhaust lines for the evacuation of exhaust gases from the combustion chamber of the engine and at least one inlet line for the supply of air to the combustion chamber. The turbocharger unit includes at least one turbine which cooperates with at least one compressor to extract energy from the exhaust flow of the engine and pressurize the inlet air of the engine. The turbine is provided with a worm-shaped housing having at least two flow paths which are defined by guide tongues in the housing and which conduct mutually separate exhaust flows via stator blades to at least one turbine wheel. In order to maintain the kinetic energy in the separate exhaust flows, each respective guide tongue meets a stator blade extending toward the tongue.

6 Claims, 4 Drawing Sheets

U.S. PATENT DOCUMENTS

| | | | | |
|---|---|---|---|---|
| 4,111,598 A | * | 9/1978 | Kasuya | 415/205 |
| 4,177,005 A | * | 12/1979 | Bozung et al. | 415/205 |
| 4,389,845 A | * | 6/1983 | Koike | 60/602 |
| 4,443,153 A | * | 4/1984 | Dibelius | 415/205 |
| 4,611,465 A | * | 9/1986 | Kato et al. | 60/602 |
| 4,729,715 A | * | 3/1988 | Wilde | 415/205 |
| 6,324,847 B1 | * | 12/2001 | Pierpont | 60/602 |
| 7,287,379 B2 | * | 10/2007 | Gobert et al. | 60/612 |
| 7,395,668 B2 | * | 7/2008 | Gobert et al. | 60/612 |
| 7,481,056 B2 | * | 1/2009 | Blaylock et al. | 60/602 |
| 2007/0089415 A1 | * | 4/2007 | Shimokawa et al. | 60/605.1 |

FOREIGN PATENT DOCUMENTS

| | | | | |
|---|---|---|---|---|
| DE | 4242494 | C1 | * | 9/1993 |
| DE | 10312324 | B3 | * | 6/2004 |
| GB | 987582 | | * | 3/1965 |
| JP | 60003500 | A | * | 1/1985 |
| JP | 01056922 | A | * | 3/1989 |
| JP | 04140425 | A | * | 5/1992 |

* cited by examiner

TURBO CHARGER UNIT COMPRISING DOUBLE ENTRY TURBINE

BACKGROUND AND SUMMARY

The present invention relates to a turbocharger unit for a multicylinder internal combustion engine having at least two exhaust lines for the evacuation of exhaust gases from the combustion chamber of the engine and at least one inlet line for the supply of air to said combustion chamber, comprising at least one turbine which cooperates with at least one compressor to extract energy from the exhaust flow of the engine and pressurize the inlet air of the engine, which turbine is provided with a worm-shaped housing having at least two flow paths which are defined by means of tongues in the housing and which conduct mutually separate exhaust flows via stator blades to a turbine wheel.

The state of the art as regards turbocharger systems for the supercharging of diesel-type internal combustion engines, especially for heavy-duty vehicles, usually comprises a single-stage compressor driven by a single-stage turbine, both of the radial type.

Superchargers suitable for a diesel engine of 6 to 20 liter cubic capacity normally have an efficiency of between 50% and 60% ($\eta_{compressor} * \eta_{mechanical} * \eta_{turbine}$) under stationary conditions. In contemporary diesel engines, the yield from good efficiency is lower than for future engines, which will require higher charging pressure. Examples of systems which increase the supercharging requirement are exhaust gas recirculation for lower-nitrogen oxide emissions or systems offering variable control of inlet valves. Turbocharger systems with higher efficiency than 60% under stationary conditions offer a greater prospect of meeting future requirements for environmentally friendly and fuel-efficient engines. To date, environmental demands upon diesel engines have usually resulted in poorer efficiency, which has therefore meant that the energy resource of the fuel has been less well utilized.

The turbine worm for a six-cylinder diesel engine is traditionally of the "twin-entry" type. The exhaust gases from cylinders 1-3 are conducted in one duct and the exhaust gases from cylinders 4-6 are conducted in another. These ducts run parallel right up to the turbine inlet, so that the division is made above the height of the blades. A turbine worm of the "double-entry" type may also be used. This type is made in such a way that the duct from one cylinder group provides 180° of the turbine inlet and the other cylinder group provides the remaining 180°. When the exhaust valves of the engine are opened, a powerful pulse of exhaust-gas is obtained. In a 6-cylinder engine, this pulse is generated alternately in the front and rear cylinder group at 120° (crankshaft) intervals. The pressures in the two groups may appear as in the diagram shown in FIG. 5.

Where a turbine worm of the "double-entry" type is used, together with inlet guide rails to the turbine, it is important that the ducts are kept separate for as long as possible; ideally they should not be joined until after the guide rails. The reason is that the pressure pulse from the one group (for example cylinders 1-3) must not leak over to the other, since it will be largely lost.

A conventional configuration of the guide rails can appear as shown in FIG. 3. The number of guide rails is expediently made as an even number, since two of the blades can lie directly adjacent to the two tongues of the worm. The worm-shaped turbine housing is normally produced with tongues, in one piece, by die casting. The guide rails are placed on an annular component which is fitted at the outlet opening of the turbine housing. For production reasons, therefore, the tongues cannot pass within the platform diameter of the guide rails.

It is desirable to produce a turbocharger unit which makes effective use of exhaust-gas pulses from a multicylinder engine in order to increase the transient response and efficiency of the engine.

A turbocharger unit, which is according to an aspect of the invention and which is configured for this purpose, for a multicylinder internal combustion engine having at least two exhaust lines for the evacuation of exhaust gases from the combustion chamber of the engine and at least one inlet line for the supply of air to said combustion chamber comprises at least one turbine, which cooperates with at least one compressor to extract energy from the exhaust flow of the engine and pressurize the inlet air of the engine, which turbine is provided with a worm-shaped housing having at least two flow paths which are defined by means of tongues in the housing and which conduct mutually separate exhaust flows via stator blades to a turbine wheel and is characterized in that each respective tongue meets a stator blade extended toward the tongue. This configuration of the turbocharger unit allows the efficiency to be kept high, at the same time as transient response is improved.

BRIEF DESCRIPTION OF THE FIGURES

The invention will be described in greater detail below with reference to illustrative embodiments shown in the appended drawings, in which.

DETAILED DESCRIPTION

The invention is described as used in a two-stage supercharging system for, primarily, diesel engines having a cubic capacity of between about 6 and about 20 liters, for use especially on heavy-duty vehicles such as trucks, buses and construction machinery. A characteristic of the supercharging system is that it gives a considerably more effective supercharge compared with current systems. The supercharging is realized in two stages with two series-connected compressors of the radial type, with intermediate cooling. The first compressor stage, referred to as the low-pressure compressor, is driven by a low-pressure turbine of the axial type. The second compressor stage, the high-pressure compressor, is driven by a high-pressure turbine of the radial type.

Figure 1:
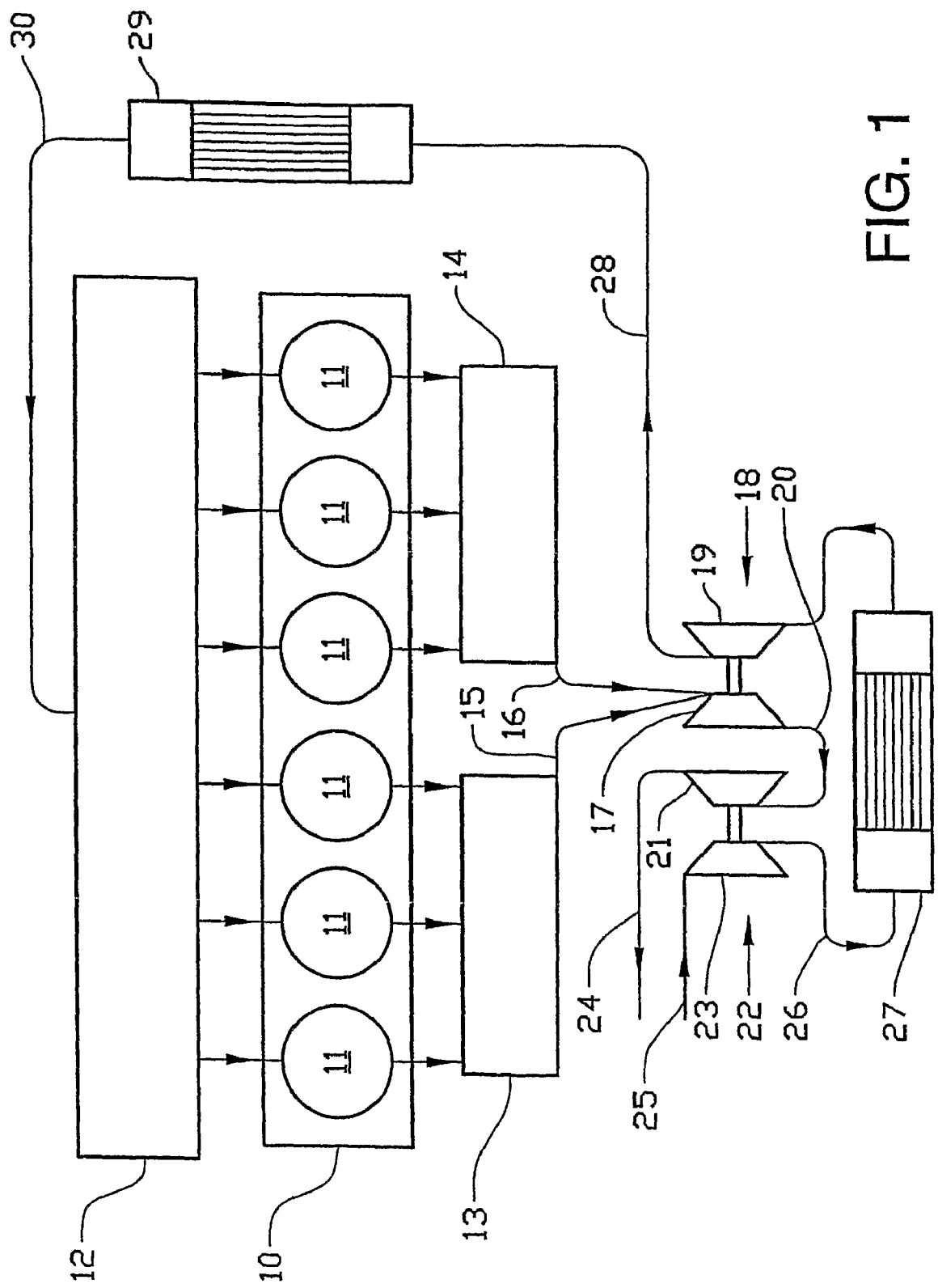
FIG. 1 shows in diagrammatic representation an internal combustion engine having a two-stage turbocharger system.

FIG. 1 shows an engine block 10 comprising six engine cylinders 11, which communicate conventionally with an induction manifold 12 and two separate exhaust manifolds 13, 14. Each of these two exhaust manifolds receives exhaust gases from three of the engine cylinders. The exhaust gases are conducted via separate pipe lines 15, 16 up to a turbine 17 in a high-pressure turbo unit 18, which comprises a compressor 19 mounted on a common shaft with the turbine 17.

The exhaust gases are conducted onward through a pipe line 20 to a turbine 21 in a low-pressure turbo unit 22, which comprises a compressor 23 mounted on a common shaft with the turbine 21. The exhaust gases are finally conducted onward through a pipe line 24 to the exhaust system of the engine, which can comprise units for the aftertreatment of exhaust gases.

Filtered inlet air is admitted to the engine through the pipe line 25 and is conducted to the compressor 23 of the low-pressure turbo unit 22. A pipe line 26 conducts the inlet air onward via a first charge-air cooler 27 to the compressor 19 of the high-pressure turbo unit 18. Following this two-stage supercharging with intermediate cooling, the inlet air is conducted onward through the pipe line 28 to a second charge-air cooler 29, after which the inlet air reaches the induction manifold 12 via the pipe line 30.

Figure 2:
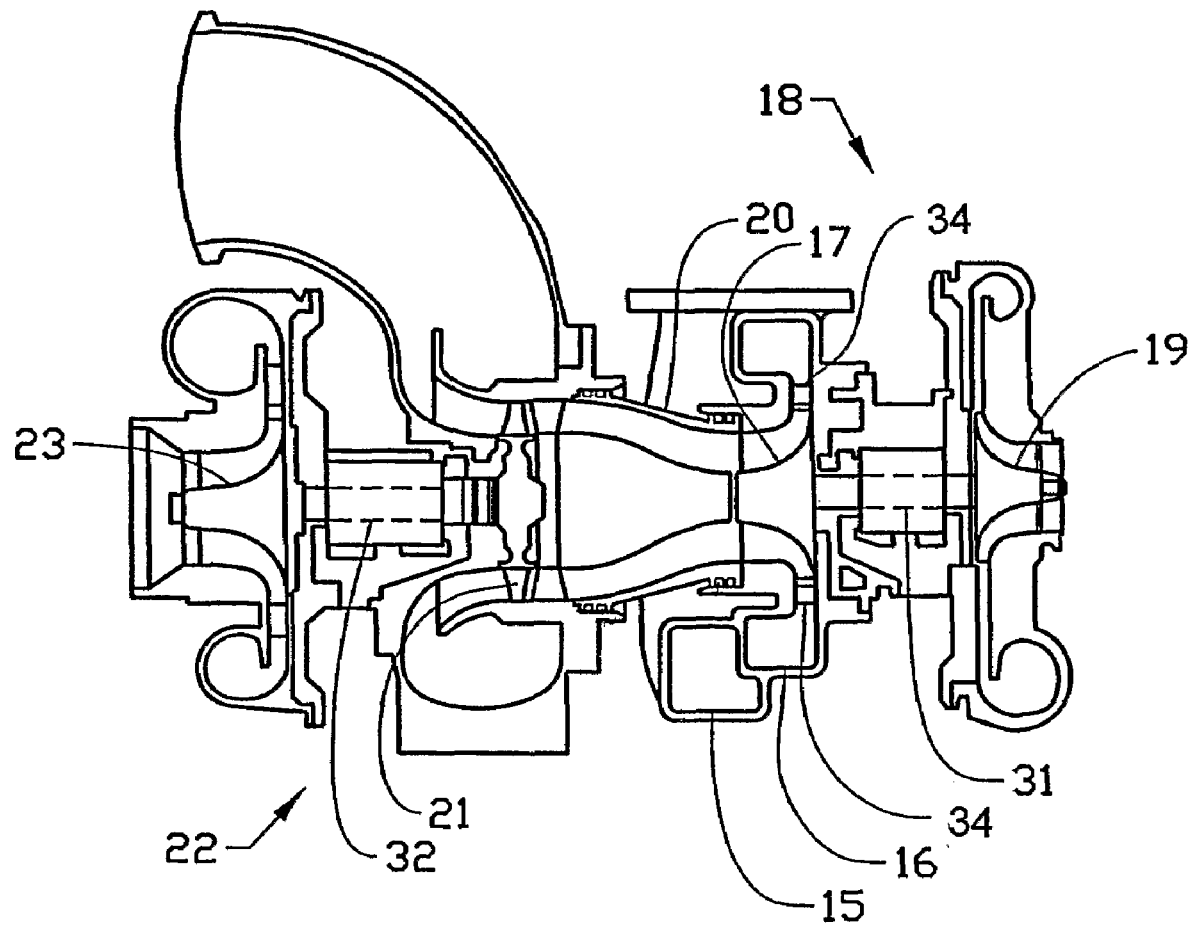
FIG. 2 is a longitudinal section through the two turbocharger stages belonging to the turbocharger system.

The turbocharger system is shown in greater detail in FIG. 2, which illustrates the double, worm-shaped inlets 15, 16 to the high-pressure turbine 17, which inlets each provide half the turbine with gas flow via stator blades 34. The high-pressure turbine 17 is of the radial type and is connected to the low-pressure turbine 21 by the intermediate duct 20. The high-pressure turbine 17 is mounted together with the high-pressure compressor 19 on the shaft 31. The low-pressure turbine 21 is correspondingly mounted together with the low-pressure compressor 23 on the shaft 32.

Figure 3:
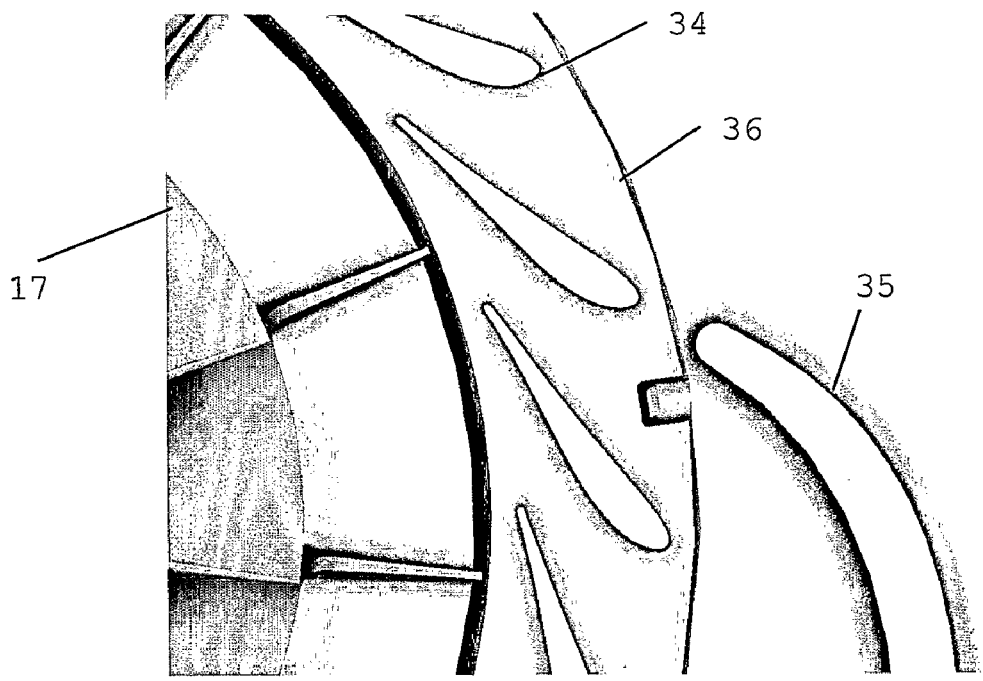
FIG. 3 shows in partially broken plan view a conventional turbine wheel with stator blades and tongue.

FIG. 3 shows a part of a conventional turbine inlet with stator blades 34 and a guide tongue 35, which latter divides the inlet in such a way that the gas flows through the inlets 15, 16 are kept separate from each other until they meet the stator blades 34 disposed on a common ring 36. A corresponding guide tongue (not shown) is placed on the opposite side of the turbine housing, so that the gas flow from the inlet 15 (see FIG. 2) is conducted toward one half of the stator ring 36, while the gas flow from the inlet 16 (see FIG. 2) is conducted toward the other half As can be seen from FIG. 3, the stator blades 34 on the conventionally configured ring 36 are identically alike, which unfortunately allows a certain leak flow between the two inlets 15, 16. This means that the maximum kinetic energy in the pressure pulses alternately generated in the inlets 15, 16 cannot be fully utilized. The turbine can have an even or an odd number of stator blades.

Figure 4:
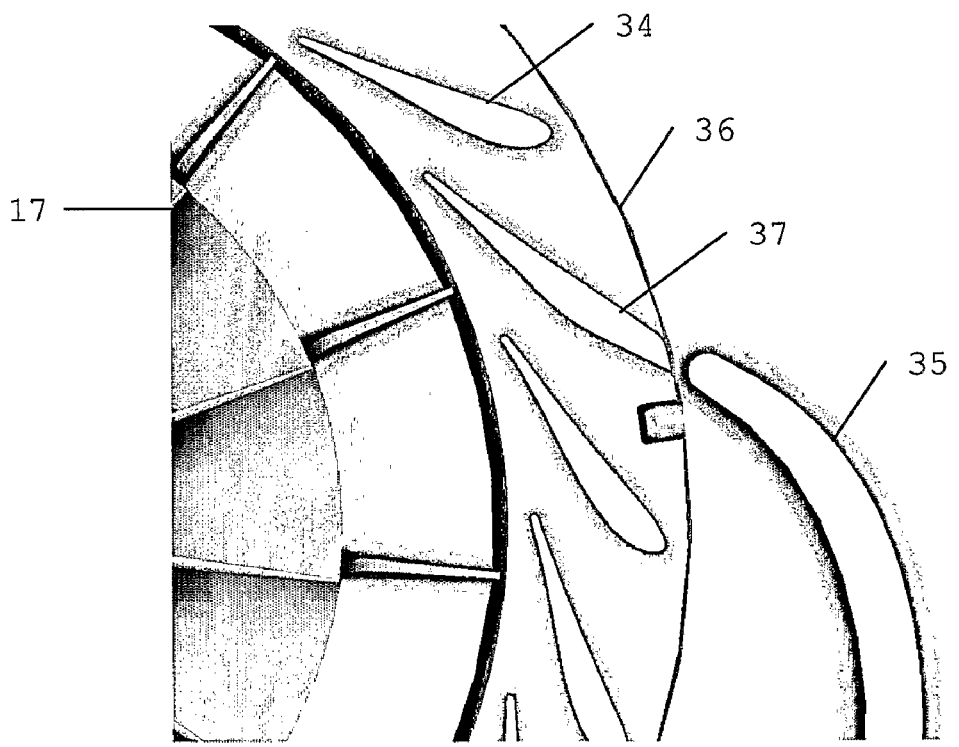
FIG. 4 shows, in a manner corresponding to FIG. 3, a turbine wheel with stator blades and tongue according to the invention.
Figure 5:
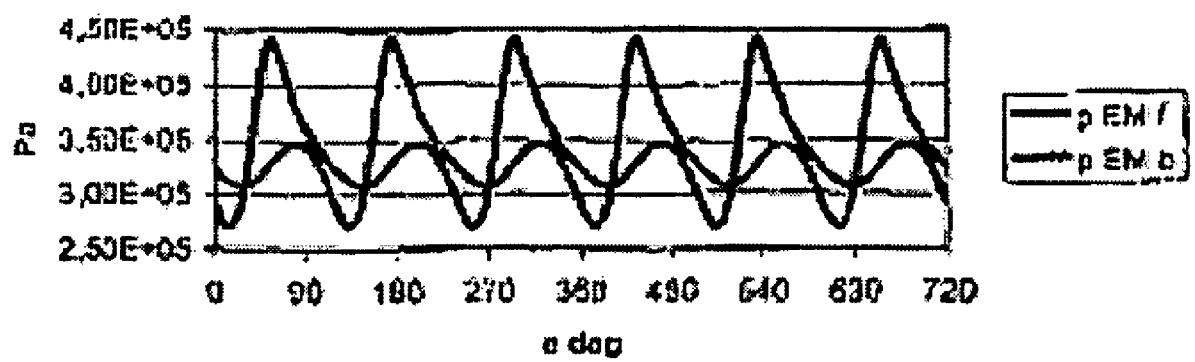
FIG. 5 shows pressures in front and rear cylinder groups of an engine.

FIG. 4 shows a ring configured according to the invention and having stator blades, which ring is realized in such a way that each respective tongue 35 meets a stator blade 37 extended toward the tongue. The two longer stator blades 37 connect with the two guide tongues 35 of the worm. The leakage can then be reduced to a negligible level.

The invention should not be deemed to be limited to the illustrative embodiments described above, but rather a number of further variants and modifications are conceivable within the scope of the subsequent patent claims. For example, the turbocharger unit according to the invention is described in connection with a six-cylinder diesel engine with two-stage turbocharging, but the invention is applicable to all the different piston engines from one cylinder and upward with single-stage or multi-stage charging and which are driven in two-stroke or four-stroke. The invention can also be applied to vessel engines and to engines with different cubic capacities than those previously stated.

The invention claimed is:

1. A method of using a turbocharger unit in a six-cylinder diesel engine, the turbocharger unit having at least two exhaust lines for evacuation of exhaust gases from a combustion chamber of the engine and at least one inlet line for supply of air to the combustion chamber, comprising at least one turbine, the at least one turbine cooperating with at least one compressor to extract energy from the exhaust flow of the engine and to pressurize inlet air of the engine, the turbine comprising a worm-shaped housing having at least two flow paths which are defined by guide tongues in the housing and which conduct separate exhaust flows via stator blades to a turbine wheel, wherein each respective guide tongue meets a stator blade extended toward the tongue, wherein the stator blade extended toward each respective guide tongue is longer than other stator blades of the turbocharger unit, comprising conducting exhaust gases from cylinders 1-3 in one flow path of the at least two flow paths and conducting exhaust gases from cylinders 4-6 in another flow path of the at least two flow paths.

2. A method of using a turbocharger unit in a six-cylinder diesel engine, the turbocharger unit having at least two exhaust lines for evacuation of exhaust gases from a combustion chamber of the engine and at least one inlet line for supply of air to the combustion chamber, comprising at least one turbine, the at least one turbine cooperating with at least one compressor to extract energy from the exhaust flow of the engine and to pressurize inlet air of the engine, the turbine comprising a worm-shaped housing having at least two flow paths which are defined by guide tongues in the housing and which conduct separate exhaust flows via stator blades to a turbine wheel, wherein each respective guide tongue meets a stator blade extended toward the tongue, wherein the stator blade extended toward each respective guide tongue is longer than other stator blades of the turbocharger unit, and wherein there is an even number of stator blades, comprising conducting exhaust gases from cylinders 1-3 in one flow path of the at least two flow paths and conducting exhaust gases from cylinders 4-6 in another flow path of the at least two flow paths.

3. A method of using a turbocharger unit in a six-cylinder diesel engine, the turbocharger unit having at least two exhaust lines for evacuation of exhaust gases from a combustion chamber of the engine and at least one inlet line for supply of air to the combustion chamber, comprising at least one turbine, the at least one turbine cooperating with at least one compressor to extract energy from the exhaust flow of the engine and to pressurize inlet air of the engine, the turbine comprising a worm-shaped housing having at least two flow paths which are defined by guide tongues in the housing and which conduct separate exhaust flows via stator blades to a turbine wheel, wherein each respective guide tongue meets a stator blade extended toward the tongue, wherein the stator blade extended toward each respective guide tongue is longer than other stator blades of the turbocharger unit, and wherein there is an odd number of stator blades, comprising conducting exhaust gases from cylinders 1-3 in one flow path of the at least two flow paths and conducting exhaust gases from cylinders 4-6 in another flow path of the at least two flow paths.

4. A turbocharger unit for a multicylinder internal combustion engine having at least two exhaust lines for evacuation of exhaust gases from a combustion chamber of the engine and at least one inlet line for supply of air to the combustion chamber, comprising at least one turbine, the at least one turbine cooperating with at least one compressor to extract energy from the exhaust flow of the engine and to pressurize inlet air of the engine, the turbine comprising a worm-shaped housing having at least two flow paths which are defined by guide tongues in the housing and which conduct separate exhaust flows via stator blades to a turbine wheel, wherein each respective guide tongue meets a stator blade extended toward the tongue, wherein the stator blade extended toward each respective guide tongue is longer than other stator blades of the turbocharger unit.

5. The device as claimed in claim 4, wherein there is an even number of stator blades.

6. The device as claimed in claim 4, wherein there is an odd number of stator blades.

* * * * *